Nov. 25, 1969     S. BOHM     3,479,946
PHOTOGRAPHIC CAMERA WITH OSCILLATING FLAP SHUTTER
Filed March 7, 1967     3 Sheets-Sheet 1
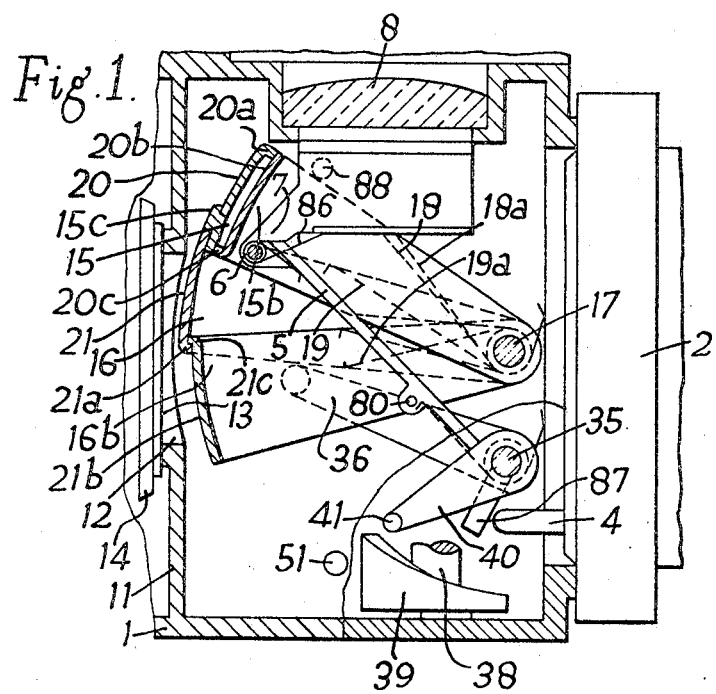
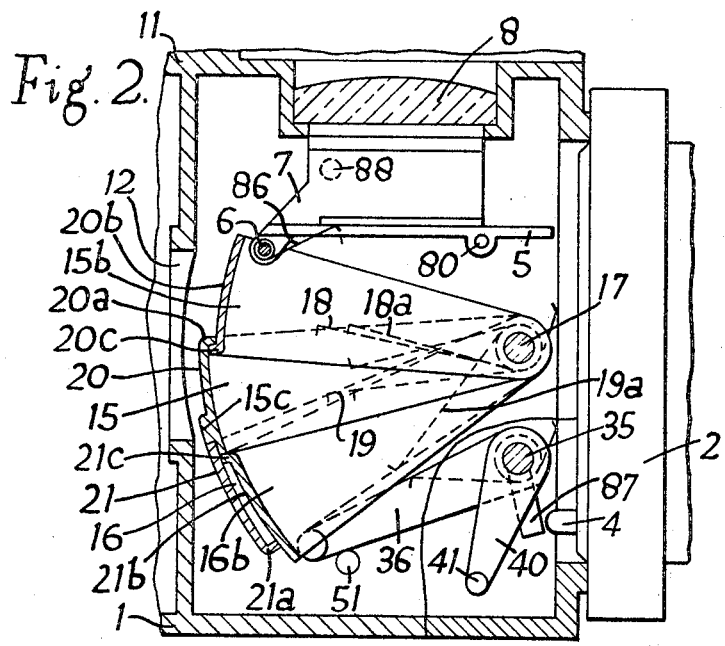
INVENTOR
SIEGFRIED BÖHM
By Young & Thompson
Attys.

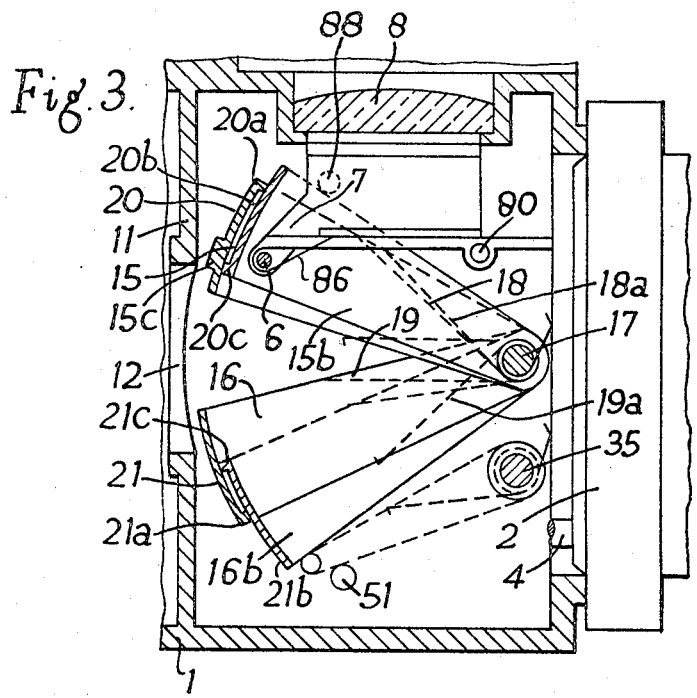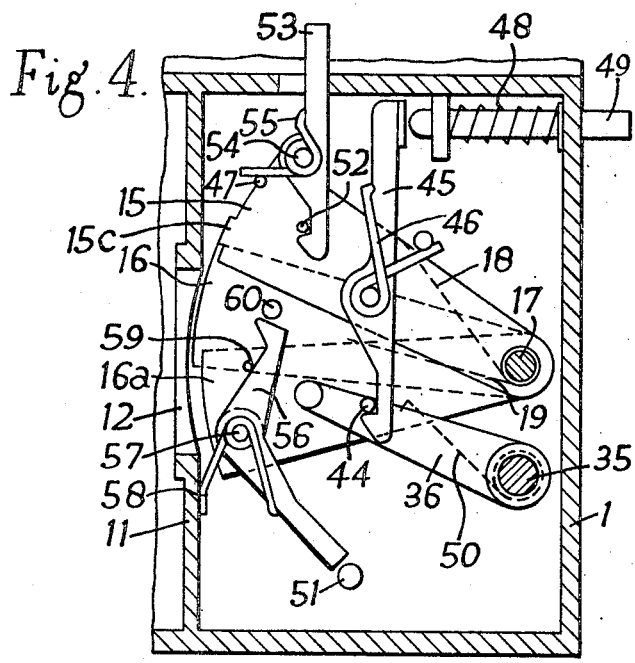

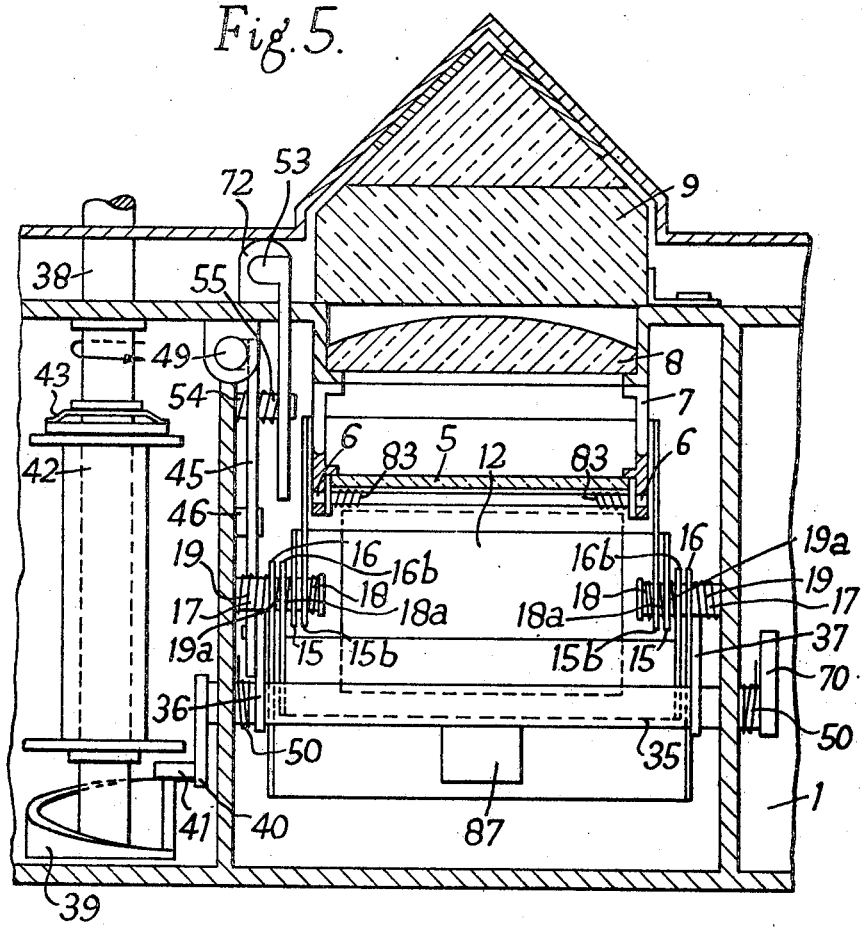

3,479,946
PHOTOGRAPHIC CAMERA WITH OSCILLATING
FLAP SHUTTER
Siegfried Bohm, Dresden, Germany, assignor to VEB
Pentacon Dresden Kamera- und Kinowerke
Filed Mar. 7, 1967, Ser. No. 621,179
Int. Cl. G03b 9/26
U.S. Cl. 95—60                                 11 Claims

ABSTRACT OF THE DISCLOSURE

A photographic camera having a shutter comprising two pairs of part cylindrical swinging-flaps movable along two curved closely adjacent paths between the objective and film gate about a common pivot. The outmost flaps of each pair abut each other when the shutter is closed in either its cocked or normal rest position. The arcuate length of each of the part cylindrical flaps is shorter than the height of the film gate aperture. On release of the shutter from its cocked position, the pairs of flaps run off in sequence to effect exposure.

---

The invention relates to a photographic camera with or without a reflex device, an oscillating flap shutter which moves over the gate being provided between the taking lens and the film base.

Photographic cameras with an oscillating flap shutter are already known. This system, however, is confined to photographic cameras which have no reflex device and in which the path of the rays coming from the taking lens encounters the film direct when the shutter is opened. In these known types of photographic camera with an oscillating flap shutter, the latter consists mainly of two oscillating flaps pivotably mounted on both sides of common bearing pins and moving past the gate in a direction either parallel or perpendicular to the film.

A common feature of these photographic cameras with oscillating flap shutters, of which the construction and operations are already known, is that the cylindrically curved part of each oscillating flap, which part moves past the gate, is necessarily made sufficiently large to ensure that whether the shutter in the cocked position or has run its course the cylindrically curved shutter part of the oscillating flap will completely cover the gate and extend beyond it on all sides, so that no light enters and encounters the film when the shutter is closed. Owing to the dimensions required for the cylindrically curved shutter parts of each oscillating flap, a correspondingly large space is required in the photographic camera, to accommodate the oscillating flaps and enable them to move, and the dimensions of the camera have to be increased accordingly. This is particularly undesirable in case of miniature cameras.

A decisive drawback of the known types of oscillating flap shutters, resides in the fact that they are unsuitable for use with photographic cameras provided with a reflex device. This is due to the fact that with oscillating flap shutters of the known kind the oscillating flaps prevent the reflex device from being accommodated inside the camera housing, between the lens and the shutter, owing to the cylindrically curved shutter parts of the said flaps, which extend beyond the gate, and owing to the range of movement thus required on both sides of the gate.

The foregoing conditions apply equally to the known photographic cameras which the shutter does not consist of oscillating flaps, the shutter devices being constructed as cylindrically curved slides, moving past the gate, along a circular path, and thus causing the film to be exposed for the particular time selected.

In the invention covered by the earlier copending patent application reference 117,750 a design was disclosed for a photographic camera with an oscillating flap shutter, enabling the aforementioned drawbacks of the known photographic cameras with oscillating flap shutter to be overcome and providing a construction in which the photographic camera could be used in conjunction with an oscillating flap shutter and with or without a reflex device between the said shutter and the taking lens.

The earlier patent application (reference 117,750) is based on a photographic camera with an oscillating flap shutter, including a gearing which is coupled with the film transport and serves to cock the shutter, as well as devices for releasing the shutter, in conjunction with an exposure control system. The invention is mainly characterised by the shutter having oscillating flaps with which the length of the cylindrically curved parts of the shutter is shorter than the height or the width of the opening forming the gate, combined with the fact that flexible curtains covering the gate are connected with the shutter parts.

A further characteristic resides in the fact that a cocking shaft coupled with the film transport is provided, enabling the shutter to be cocked and the reflex mirror to be returned to the operating position and also enabling the shutter to be released and the exposure time and diaphragm to be controlled.

According to the construction suggested here, and in contradistinction to the known designs described at the beginning, the oscillating flaps are not provided with cylindrically curved shutter parts which extend beyond the complete gate in each case but are constructed in such a way that the length of the cylindrically curved shutter parts is shorter than the height or width of the opening forming the gate. In addition to the resulting reduction in the space required and in the range of movement, with the consequently reduced dimensions for the photographic camera, this system above all offers the advantage of eliminating all obstacles to the installation of a reflex device between the oscillating flap shutter and the taking lens in the camera housing. It has thus become possible, for the first time, for the advantages of the oscillating flap shutter, which are provided by its simple construction and operation, to be utilised likewise in photographic cameras provided with a reflex device.

It is a known fact that in the case of photographic cameras with a slotted shutter which runs its course in the zone of the plane of the film far shorter exposure times are obtainable than in the case of the between-lens shutters built into the taking lens, owing to the fact that a narrow slot is produced and owing to the consequently punctiform film exposure obtained when the shutter runs its course. On the other hand, the slotted shutters, in the case of roller blind shutters of flexible materials, are more sensitive to extreme temperatures and changing climatic conditions than are the aforementioned between-lens shutters provided with metallic blades.

The purpose of the present invention is therefore to provide a photographic camera with or without a reflex device and with an oscillating flap shutter, flexible curtains being avoided and the oscillating flaps being made of temperature resisting material, such as anodized metal or plastic, and nevertheless without the need to increase the space for accommodating the oscillating trap shutter and for its range of movement and above all without in any way preventing or impeding the installation of a reflex device between the shutter and the taking lens.

The invention is based on a photographic camera with oscillating flap shutter in accordance with the earlier patent application (reference 117,750), in which a cocking shutter is provided, which is coupled with the winding gearing for film transport and which serves not only to cock the shutter and to return the reflex mirror to the operating position but also to release the shutter and to control the exposure time and the diaphragm. The invention resides in the fact that the oscillating flap shutter consists of a number of oscillating flaps, preferably of two pairs, which can be moved into and out of one another, and which are pivotable about a common bearing, the length of the cylindrically curved shutter part being shorter, in the case of each oscillating flap, than the height or width of the opening forming the gate.

According to the invention, each pair of oscillating flaps has at least two such flaps which can be moved into and out of one another by means of expanding springs and which are provided with folds bent inwards or outwards and forming the stop devices by which the combined movement of the oscillating flaps and their pivoting movement are limited. When the shutter is in the cocked position one pair of oscillating flaps is moved apart by the action of the expanding springs, while the other pair are moved into each other by means of a stop and in opposition to the action of the expanding springs corresponding to that pair. In this process the gate is covered over by both pairs of oscillating flaps. After the shutter has been released and run its course through the action of spring, the gate is first of all gradually exposed by one pair of oscillating flaps, after which the other pair comes into operation, in accordance with the exposure time selected and producing a slot width appropriate to the said exposure time, and gradually recloses the gate. The expanding springs associated with the oscillating flaps have an additional function, in that one expanding spring accelerates the shutter movement at the beginning, while the other expanding spring brakes it at the end.

The following details and the drawings provided in FIGURES 1-5 describe and illustrate a certain embodiment of the invention, indicating further characteristics of the latter. Those parts which are the same as in the older patent application reference 117,750 have been given the same reference numbers.

The drawings are as follows:

FIGURE 1 is a lateral sectional diagram of the photographic camera, the oscillating flap shutter being shown in the wound and cocked position;

FIGURE 2 is a lateral sectional diagram in accordance with FIGURE 1, the oscillating flap shutter being shown in the position which it occupies after it has run its course;

FIGURE 3 is a lateral sectional diagram in accordance with FIGURES 1 and 2, the oscillating flap shutter being shown in the course of operation and open;

FIGURE 4 is a lateral sectional diagram of the device for releasing the oscillating flap shutter and for the control of the exposure time;

FIGURE 5 is a front sectional view of part of the photographic camera, the oscillating flap shutter being shown in operation and open, in accordance with FIGURE 3, In the example shown, 1 is the housing of a single lens reflex camera which is preferably provided with an interchangeable taking lens 2 of which the diaphragm is controllable, in the known manner, by an axially movable push rod 4. The path of the rays coming from the taking lens 2 is deflected, by means of a reflex mirror 5, which is situated at an angle of 45° in relation thereto and is pivotable about the bearing shaft 6 of the view finder compartment 7, towards to a view finder device of which only the image field lens 8 and the reversing prism 9 are shown. The reflex mirror 5 can be pivoted into and out of the path of the rays coming from the lens, and in its upper position 5 it covers over the view finder compartment 7, owing to the action of a spring 86 held by the bearing shaft 6. When the reflex mirror 5 has been pivoted upwards and the oscillating flap shutter is open, then the rays from the lens, as seen in FIGURES 3 and 5, pass through the gate 12, provided in the film stage 11, onto the film 13, which is pressed against the film stage 11, in the known manner, by means of a pressure plate 14 and by the force of a spring not shown in the drawing.

The oscillating flap shutter is mounted in the camera housing 1. According to the invention, it consists of two pairs of oscillating flaps, i.e. an upper and a lower pair, pivotable about one and the same bearing pin 17.

The upper pair of oscillating flaps consist of the outer oscillating flap 15 with the cylindrically curved shutter part 20, which is provided at the upper end with a fold 20a bent inwards and which is mounted so that it can pivot about the bearing pins 17 on both sides. Within the outer oscillating flap 15 is mounted the inner oscillating flap 15b with the cylindrically curved shutter part 20b, this latter flap being provided at the lower end with a fold 20c bent outwards and being mounted so that it can pivot about the bearing pins 17 on both sides. With the outer oscillating flap 15 are associated torsion springs 18 which bring about its movement on both sides and which are held by the bearing pins 17. Furthermore, on both sides and between the outer oscillating flap 15 and the inner oscillating flap 15b, expanding springs 18a are mounted around the bearing pins 17 and tend to move the two oscillating flaps 15 and 15b away from each other. This position is limited by the folds 20b and 20c provided on the two oscillating flaps 20b and 20c provided on the two oscillating flaps 15 and 15b.

The lower pair of oscillating flaps consists of the outer oscillating flaps 16 with the cylindrically curved shutter part 21, which is provided at the lower end with a fold 21a bent outwards and which is mounted so that it can pivot about the bearing pin 17 on both sides. Within the outer oscillating flap 16 is mounted the inner oscillating flap 16b, with the cylindrically curved shutter part 21b, which is provided at the upper end with a fold 21c bent outwards and which is likewise mounted so that it can pivot about the bearing pins 17. With the outer oscillating flap 16 are associated torsion springs 19 which bring about its movement on both sides and which are held by the bearing pins 17. In addition, on both sides and between the outer oscillating flaps 16 and the inner flap 16b, expanding springs 19a are provided, which tend to move the two oscillating flaps 16 and 16b away from each other. This position is limited by the folds 21a and 21c, provided on the two oscillating flaps 16a and 16b.

According to the invention, the cylindrically curved shutter part 20, 20b, 21 and 21b of the oscillating flap 15, 15b, 16 and 16b respectively is constructed in such a way that the length of the arc is shorter than the height or width of the opening 12 forming the gate. The folds 20a, 20c, 21a and 21c belonging to the oscillating flaps and bent inwards or outwards, as the case may be, can be provided on the ends of the cylindrically curved shutter parts or at the same time on the side surfaces of the oscillating flap, thus providing a covering which excludes the light still more reliably.

For the cocking of the oscillating flap shutter, a gearing is provided such as proposed in the earlier patent application (reference 117,750). The main parts of the cocking mechanism, as likewise shown in the accompanying FIGURES 1-5, consist of a cocking shaft 35, pivotably mounted in the camera housing 1 and having the cocking levers 36 and 37, which engage the outer oscillating flap 16 on both sides of the lower pair of oscillating flaps. The winding movement is set up via a winding shaft 38 which bears a cam plate 39 which acts in an axial direction, a control lever 40 connected with the cocking shaft 35 sliding on the said cam plate by means of its pin 41, which may also be constructed as a roller. The film winding spool 42, which is subject to the action of a friction coupling 43, is mounted so that it can rotate about the winding shaft 38. The winding shaft 38 is connected with a film transport mechanism and can be operated by a manual knob or via a "free-wheeling" mechanism by means of a rapid winding lever which can be moved to and fro. These operating devices, already known in themselves, are not shown in the drawings.

When the shutter has run its course the oscillating flaps assume their position shown in FIGURE 2. In this case the cocking shaft 38 rests by its cocking lever 36 of the stop 51, which limits the downward movement. In this process, the inner oscillating flap 16b of the lower pair of oscillating flaps has been moved, in opposition to the action of the expanding spring 19a, into the outer oscillating flap 16, which has been caused to rest against the cocking lever 36 by the action of the torsion spring 19 and in opposition to that of the weaker expanding spring 19a. This also causes the shutter to be elastically intercepted at the end of its movement, by the expanding spring 19a. The upper pair of oscillating flaps has followed up the run-off movement, in which process, under the action of the expanding spring 18a, the inner oscillating flap 15b has moved out of the outer oscillating flap 15. This movement is limited by the folds 20a and 20c. The lower outer oscillating flap 16 is constructed in such a way that its cylindrically shaped shutter part 21 partly covers the upper outer oscillating flap 15 and contacts its collar 15c, so that when the shutter is closed the penetration of harmful light to the film is reliably prevented.

When the shutter is wound up, both pairs of oscillating flaps are moved upwards by means of the cocking shaft 38 and via the cocking levers 36 and 37, which in this case engage the outer oscillating flap 16 of the lower pair of oscillating flaps. During this winding movement the inner oscillating flaps 16b of the lower pair can be moved out of the outer oscillating flap 16, by the action of the expanding spring 19a, this movement being limited by the two folds 21a and 21c. The inner oscillating flap 15b of the upper pair forced, in opposition to the action of the expanding spring 18a into the outer oscillating flap 15, by means of a stop 88 provided on the light compartment 7.

A catch 44 is attached to the cocking lever 36 of the cocking shaft 35, and when the shutter is in the cocked position, as shown in FIGURE 4, a locking lever 45 mounted in the camera housing 1 engages the said catch, the latter lever being movable about the pin 46 and moved into the locked position by the torsion spring 47. The camera housing 1 also contains an axially movable release knob 49 which is subject to the action of a restoring spring 48 and which acts on the locking lever 45, thus, enabling the cocking shaft 35, subject to the action of a torsion spring 50 to move back into the initial position limited by a stop 51.

When the oscillating flap shutter is in the cocked position its movement is blocked by a catch 52 which is mounted on the upper oscillating flap 15 and which interacts with a timing lever 53 which engages the said catch and which is movable about a pin 54 and which is moved into the blocked position by a torsion spring 55.

As may be seen from FIGURE 4, the camera housing 1 also bears an additional double armed shift lever 56 which is movable about the pin 57 and is moved by a torsion spring 58 against the stop 59, which limits the locked position. In this position the other arm of the shift lever 56 moves under a catch 60, which is affixed to the oscillating flap 16 of the lower pair of the oscillating flaps, and thus secures the shutter in the wound up position.

Owing to the release of the cocking shaft 35, produced by the release knob 49 and via the locking lever 45, the cocking lever 36 of the said cocking shaft encounters the lower arm of the shift lever 56 and moves it out of the blocked position, so that the lower pair of oscillating flaps can then run its course, FIGURES 3 and 5 show the oscillating flaps shutter in a position which it occupies in the course of its movement, a slot enabling the film to be exposed being formed between the upper oscillating flap 15 and the lower oscillating flap 16.

The release of the timing lever 53 can be effected in the manner described in the earlier patent application (reference 117,750) by means of an exposure time control device operating mechanically, electrically or electronically, which can be released by a control disc 70 connected with the cocking shaft 35. With the cocking shaft 35 is also connected a control part 87 by which, when it interacts with the push rod 4, the diaphragm of the taking lens 2 can be controlled in the known manner and in such a way that when the shutter is cocked the diaphragm is completely open and that throughout the duration of the exposure the diaphragm can be set to the aperture appropriate to the exposure time.

To sum up, the description and illustration of an example of the invention indicate that as a further development of the object of the invention described in the earlier patent application (reference 117,750) it provides a photographic camera with an oscillating flap shutter consisting of metal or plastic with a construction which does not entail any increase in the space or in the range of movement and which may or may not have a reflex device between the taking lens and the oscillating flap shutter.

I claim:

1. In a photographic camera having a housing, an objective mounted on said housing, a film gate disposed on the optical path through the objective, film supporting means for holding said film against said film gate, film winding mechanism within said housing, shutter cocking mechanism, and a diaphragm mounted in said housing, the provision of
    (a) two pairs of part cylindrical shutter elements pivotally mounted on a common axis in said housing, one pair capable of abutting the other and of swinging between said film gate and the objective, said elements comprising elongated flaps extending over the width of the film gate aperture and each having an arcuate length less than the height of the film gate aperture, said shutter elements being movable to cocked positions by means of said shutter cocking mechanism,
    (b) resilient means which are operatively connected between said housing and said shutter elements for driving the latter on release, and which are tensioned by said shutter elements when the latter are moved to a cocked position by said shutter cocking mechanism,
    (c) release mechanism for holding said shutter elements in a cocked position and for releasing said elements,
    (d) exposure time mechanism coupled with said release mechanism to control the speed of running off of said elements on the initiation of an exposure operation,
    (e) a pivotally mounted cocking shaft for coupling said shutter cocking mechanism with said film winding mechanism for actuation of the latter simultaneously with the shutter cocking mechanism,
    (f) a return spring for said shaft, and
    (g) means coupled with said shaft for setting the aperture of said diaphragm.

2. A photographic camera in accordance with claim 1, wherein the shutter parts movable towards and away from one another are provided with folds which limit their combined movement and pivoting movement.

3. A photographic camera in accordance with claim 1, wherein the folds extend inwards on the outermost flaps and outwards on the innermost flaps.

4. A photographic camera in accordance with claim 1, wherein a torsion spring is associated with each pair of oscillating flaps and produce the movement of the latter on one side or on both sides.

5. A photographic camera in accordance with claim 1, wherein an expanding spring is associated with each pair of oscillating flaps and causes the latter to move apart, either on one side or on both sides.

6. A photographic camera in accordance with claim 1, wherein a coupling connection which takes effect during the winding movement is provided between one pair of oscillating flaps and the other pair of oscillating flaps.

7. A photographic camera in accordance with claim 6, wherein the coupling connection in the case of one pair of oscillating flaps consist of a stop which is provided on one oscillating flap and which is preferably constructed in the form of a collar and which is designed to accompany the movement of the other pair of oscillating flaps.

8. A photographic camera in accordance with claim 4, wherein pivot pins as a common supporting system, are provided on both sides for the two pairs of oscillating flaps and their torsion springs and expanding springs.

9. A photographic camera in accordance with claim 1, wherein stops are associated with the pairs of oscillating flaps in the ranges of movement of the latter, and cause the oscillating flaps to move into one another in alternation during the winding up and the run-off movement of the shutter.

10. A photographic camera in accordance with claim 1, wherein the cocking shaft bears cocking levers which effect the winding of the shutter, together with a catch by which when it interacts with a releasable locking lever the cocking shaft can be secured in the wound-up position.

11. A photographic camera in accordance with claim 1, wherein an intermediate lever is provided, which can be released by the cocking shaft and by which the run-off movement of shutter is blocked.

References Cited
UNITED STATES PATENTS

| | | | |
|---|---|---|---|
| 1,416,245 | 5/1922 | Tumey | 240—46.23 |
| 2,198,602 | 4/1940 | Carey | 95—58 |
| 3,160,084 | 12/1964 | Chatani | 95—57 |

NORTON ANSHER, Primary Examiner

L. H. McCORMICK, JR., Assistant Examiner

U.S. Cl. X.R.

95—42